(12) United States Patent
Hikmet et al.

(10) Patent No.: US 11,761,606 B2
(45) Date of Patent: Sep. 19, 2023

(54) LASER BASED WHITE LIGHT SOURCE WITH ADJUSTABLE SPARKLING

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 53 days.

(21) Appl. No.: 17/629,283

(22) PCT Filed: Jul. 6, 2020

(86) PCT No.: PCT/EP2020/069005
§ 371 (c)(1),
(2) Date: Jan. 21, 2022

(87) PCT Pub. No.: WO2021/013520
PCT Pub. Date: Jan. 28, 2021

(65) Prior Publication Data
US 2022/0252237 A1    Aug. 11, 2022

(30) Foreign Application Priority Data

Jul. 23, 2019 (EP) .................................. 19187831

(51) Int. Cl.
*G02B 27/48* (2006.01)
*F21V 3/04* (2018.01)
(Continued)

(52) U.S. Cl.
CPC .............. *F21V 3/049* (2013.01); *G02B 27/48* (2013.01); *F21W 2131/405* (2013.01); *F21Y 2115/30* (2016.08)

(58) Field of Classification Search
CPC .............................. F21V 3/049; G02B 27/48
See application file for complete search history.

(56) References Cited

U.S. PATENT DOCUMENTS 3,804,521 A * 4/1974 Sprague ................. G02B 27/48
356/600
7,660,039 B2 * 2/2010 Santoro ................ G02B 5/0252
359/15

(Continued)

FOREIGN PATENT DOCUMENTS

EP    2196844 A1    6/2010
EP    2345638 A1    7/2011
(Continued)

*Primary Examiner* — Sean P Gramling

(57) ABSTRACT

The invention provides a lighting device (1000) configured to generate lighting device light (1001), wherein the lighting device (1000) comprises (i) a first laser light source (10) configured to generate a beam (15) of first laser light source light (11), (ii) a speckle control element (30), and (iii) a control system (50), wherein in one or more control modes of the control system (50) the speckle control element (30) is configured in an optical path (16) of the first laser light source light (11) for providing the lighting device light (1001) comprising a speckle distribution (35) of the first laser light source light (11), wherein at a predetermined distance L from the lighting device (1000) the speckle distribution (35) has a first speckle contrast value C1 selected from the range of 3%<C1<100%, wherein the predetermined distance L is selected from the range of 0.5-50 m, and wherein the control system (50) is further configured to dynamically control with the speckle control element (30) the first speckle contrast value C1 in one or more of the one or more control modes.

15 Claims, 8 Drawing Sheets

(51) Int. Cl.
    *F21Y 115/30*     (2016.01)
    *F21W 131/405*     (2006.01)

(56) References Cited

U.S. PATENT DOCUMENTS

| | | | |
|---|---|---|---|
| 2006/0012842 | A1 | 1/2006 | Abu-Ageel |
| 2013/0128492 | A1 | 5/2013 | Drenten et al. |
| 2018/0320851 | A1* | 11/2018 | Zozgornik .............. H01S 3/005 |
| 2018/0321576 | A1 | 11/2018 | Altamura |
| 2019/0361327 | A1* | 11/2019 | Ma ....................... H04N 9/3194 |

FOREIGN PATENT DOCUMENTS

| | | |
|---|---|---|
| EP | 2354638 A1 | 8/2011 |
| JP | 2014032371 A | 2/2014 |
| JP | 2017102388 A | 6/2017 |
| WO | 0125684 A1 | 4/2001 |

\* cited by examiner (I)

(II)

(III)

(IV)

LASER BASED WHITE LIGHT SOURCE WITH ADJUSTABLE SPARKLING

CROSS-REFERENCE TO PRIOR APPLICATIONS

This application is the U.S. National Phase application under 35 U.S.C. § 371 of International Application No. PCT/EP2020/069005, filed on Jul. 6, 2020, which claims the benefit of European Patent Application No. 19187831.3, filed on Jul. 23, 2019. These applications are hereby incorporated by reference herein.

FIELD OF THE INVENTION

The invention relates to a lighting device and to a lighting system comprising one or more of such lighting devices.

BACKGROUND OF THE INVENTION

Laser comprising lighting devices are known in the art. US20130128492A1, for instance, describes a high brightness lighting device comprising a laser for providing high brightness coherent light and a light scattering element arranged for receiving light from the laser. The light scattering element comprises luminescent material adapted for converting part of the provided light into a different wavelength. The light scattering element is further arranged to transmit and scatter part of the provided light without conversion. Thereby, upon receiving the coherent light, light being outputted from the light scattering element has a dual lighting effect, due to the outputted light comprising high brightness incoherent light originating from converted light providing a sparkle lighting effect, and coherent light providing a speckle lighting effect. Further, a corresponding lamp comprising such a lighting device is provided.

EP2354638A discloses a lighting apparatus for generating a decorative illumination pattern. The lighting apparatus is adapted to couple a coherent light beam into a multimode fiber of the lighting apparatus such that the coherent light beam propagates in different fiber modes, which are decoupled from the multimode fiber and interfere for generating the first decorative illumination pattern, and illuminate a speckle pattern generation element with the coherent light beam for generating a speckle pattern as the first decorative illumination pattern. The first decorative illumination pattern can be modified over time by a first decorative illumination pattern modifying unit.

SUMMARY OF THE INVENTION

Based on user feedback, it appears desirable to provide light that may have a sparkling effect. For instance, it appeared attractive to use sparkling light in e.g. showrooms or in show cases. However, many types of light sources cannot provide such effect and/or appear to have a too low power.

Hence, it is an aspect of the invention to provide an alternative lighting device, which preferably further at least partly obviates one or more of above-described drawbacks. The present invention may have as object to overcome or ameliorate at least one of the disadvantages of the prior art, or to provide a useful alternative.

Lasers are light sources with properties like coherence which can lead to formation of speckle. For applications such as shop lighting and stage lighting speckle can give a sparkling appearance. The speckle contrast may (also) depend on the roughness of the illuminated surface and the coherence length of the laser light. It may therefore be possible to control the appearance of an object by controlling the coherence length of the light source. Here, amongst others a light source is described comprising at least one source giving stimulated emission where the coherence length of the light can be (gradually) adjusted and/or otherwise speckle contrast may be controlled. In specific embodiments, when more light sources with stimulated emission, such as RGB lasers, may be used then it may even possible that the speckle per color may be controlled. In further specific embodiments the use of a sensor to sense a surface roughness of a surface, such as an illuminated surface, may be sensed; the speckle (contrast) may in embodiments be adapted accordingly. For controlling the coherence length and/or otherwise speckle contrast, a vibrating and/or rotating diffusor may be used.

Hence, in an aspect the invention provides a lighting device ("device") configured to generate lighting device light. The lighting device comprises (i) a first laser light source and (ii) a speckle control element. The first laser light source is especially configured to generate a beam of first laser light source light. In specific embodiments, in an operation mode of the lighting device the speckle control element is configured in an optical path of the first laser light source light for providing the lighting device light comprising a speckle distribution of the first laser light source light. Especially, (in this operation mode) at a predetermined distance L from the lighting device the speckle distribution may in embodiments have a (first) speckle contrast value C1, especially selected from the range of 3%<C1<100%. In specific embodiments, the predetermined distance L is selected from the range of 0.2-100 m, such as especially 0.5-50 m. In yet further specific embodiments, the lighting device may further comprise or be functionally coupled to a control system. Hence, in embodiments the lighting device may further comprise (iii) a control system. The control system may be used to control one or more speckle parameters, especially the first speckle contrast value. In further embodiments, in one or more control modes of the control system the speckle control element is configured in an optical path of the first laser light source light for providing the lighting device light comprising a speckle distribution of the first laser light source light (see also above). Further, especially the control system may further be configured to dynamically control (with the speckle control element) the first speckle contrast value C1 in one or more of the one or more control modes. Hence, especially the invention provides in embodiments a lighting device configured to generate lighting device light, wherein the lighting device comprises (i) a first laser light source configured to generate a beam of first laser light source light, (ii) a speckle control element, and (iii) a control system, wherein in one or more control modes of the control system the speckle control element is configured in an optical path of the first laser light source light for providing the lighting device light comprising a speckle distribution of the first laser light source light, wherein at a predetermined distance L from the lighting device the speckle distribution has a first speckle contrast value C1 selected from the range of 3%<C1<100%, wherein the predetermined distance L is selected from the range of 0.5-50 m, and wherein the control system is further configured to dynamically control with the speckle control element the first speckle contrast value C1 in one or more of the one or more control modes.

With such device it may be possible to create the desired speckle, such as the desired speckle contrast. It may also be possible to vary the speckle, such as the desired speckle contrast. For instance, it may be possible to dynamically vary speckle, such as the desired speckle contrast. Nevertheless, as a laser is used a relatively high intensity lighting device is possible. Hence, whereas lasers may amongst others be known for their coherence, in the present invention deliberately the coherence length may (substantially) be reduced and/or the beam intensity pattern may substantially be affected as speckle (contrast) is introduced. The introduced speckle and/or the variation in speckle contrast value over time may provide a sparkling and lively effect. This may be useful in e.g. showrooms and showcases, but this may also be useful for stage lighting, etc. In embodiments, it may also be possible to take into account the roughness of a surface (see further also below).

As indicated above, the lighting device is configured to generate lighting device light (during operation of the lighting device).

In embodiments, the lighting device light may have one or more fixed optical properties, such as selected from color point and color rendering index (CRI). Hence, in embodiments the lighting device may have a single operation mode with a fixed spectral distribution of the lighting device light. In such embodiments, the (first) speckle contrast value (see also below) may also be fixed. However, in other embodiments (first) the speckle contrast value may be variable. In yet further embodiments, the lighting device may have two or more operation modes wherein one or more of color point, color rendering index, and (first) speckle contrast value may be variable. In embodiments, one or more of color point and color rendering index (CRI) may be variable and the (first) speckle contrast value may be fixed. In yet other embodiments one or more of color point and color rendering index (CRI) may be fixed and the (first) speckle contrast value may be variable. As will be further elucidated below, especially the (first) speckle contrast value may be variable, such as dynamically variable.

In embodiments, the lighting device comprises (i) a first laser light source configured to generate a beam of first laser light source light, (ii) a speckle control element.

The term "laser light source" especially refers to a laser. Such laser may especially be configured to generate laser light source light having one or more wavelengths in the UV, visible, or infrared, especially having a wavelength selected from the range of 200-2000 nm, such as 300-1500 nm. The term "laser" especially refers to a device that emits light through a process of optical amplification based on the stimulated emission of electromagnetic radiation. Especially, in embodiments the term "laser" may refer to a solid-state laser. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc. In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc. As can be derived from the below, the term "laser light source" may also refer to a plurality of (different) laser light sources.

The term "beam of laser source light" and similar terms especially indicate that the light emanating from the laser source has some coherence. This is known for lasers. For instance, the coherence length of a beam propagating in vacuum without being intercepted by (optical) elements may be at least 10 cm, such as at least 15 cm. However, much longer is also possible, like at least 1 m, or over 10 m, or even yet much more.

The speckle control element is especially used to control speckle of the beam of laser light source light. With the speckle control element speckle or speckleness can be controlled. For instance, the number of speckles, the density of the speckles, and speckle contrast. Especially, speckle contrast may herein be controlled. The speckle control element may in embodiments also be indicated as a speckle reduction or enhancement element.

In an operation mode of the lighting device, the speckle control element is configured in an (first) optical path of the first laser light source light for providing the lighting device light comprising a speckle distribution of the first laser light source light. The beam of laser light source light emanates from the laser light source and follows an optical path. In an operation mode, the speckle control element is in the optical path. In this way, a predefined speckle contrast may be generated.

In embodiments, the speckle control element may be at a fixed position. In such embodiments, the speckle control element may essentially always be in the (first) optical path of the laser light source. In other embodiments, the speckle control element may have a movable position. In specific embodiments, the lighting device may have two or more operation modes, wherein in one or more operation modes the speckle control element is configured in the (first) optical path and in one or more other operation modes the speckle control element is not in the (first) optical path.

The term "operation mode" may also refer to a plurality of different operation modes.

Herein, speckle is especially determined relative to a predetermined distance ("distance") from the device. Hence, at a length from the device, the speckle contrast may be measured, especially at an essentially flat white surface. For instance, a Teflon surface with a low roughness may be chosen, which has a relatively high specular reflection. Speckle may especially be determined with an optical axis of the light essentially perpendicular to the surface where the speckle (contrast) is measured. Hence, the speckle contrast value may be determined on a (virtual) cross-sectional plane of the (beam) of lighting device light essentially perpendicular to an optical axis thereof.

The (speckled) light from the lighting device may escape from the lighting device via an opening or window. The (predetermined) distance may be measured from the opening or window. In specific embodiments, the predetermined distance L may be selected from the range of 0.2-100 m, especially 0.5-50 m, such as from the range of 1-40 m, like in the range of 1-25 m. For most application in rooms, museums, stage lighting, a distance selected from the range of 0.5-50 m may be suitable. This distance may be a fixed distance, associated with the (settings of the) lighting device.

However, in other embodiments the speckle control element may also be used to control the predetermined distance. Alternatively or additionally, (controllable) optics may be used to (further) determine the predetermined distance. Hence, in embodiments application dependent the predetermined distance may be set.

At the predetermined distance L from the lighting device the speckle distribution has a first speckle contrast value C1 selected from the range of 3%<C1≤100%, such as especially 3%<C1<100%. The term "speckle contrast value" refers to the value of the speckle contrast. The term "speckle contrast" is known in the art, see e.g. David Briers et al., in "*Laser speckle contrast imaging: theoretical and practical limitations*". Journal of Biomedical Optics, June 2013, vol. 18(6), p. 066018-1-066018-9, which is herein incorporated by reference, or M. Nadeem Akram et al., in "*Speckle reduction methods in laser-based picture projectors*", Optical Review, 2016, 23, 1, p. 108-120 (10.1007/s10043-015-0158-6), which is (also) herein incorporated by reference. The speckle contrast value (C) may be defined as the ratio of the standard deviation ($\sigma$) of the intensity of the captured image to the mean ($<I>$) of the intensity of the pattern.

The lighting device may further comprise (iii) a control system or may be functionally coupled to a control system. The latter embodiment is discussed as lighting device comprising the control system.

Especially, the control system is configured to control the speckle control element. The control system may in embodiments have one or more control modes. These control modes may be different control modes (see further also below).

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

Hence, in embodiments the control system manages, commands, directs, or regulates the behavior of other devices or systems, for instance using control loops.

Hence, the control system may in embodiments define the mode of operation.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Therefore, when the control system is available in one or more control modes of the control system the speckle control element is configured in an optical path of the first laser light source light for providing the lighting device light comprising a speckle distribution of the first laser light source light, wherein at a predetermined distance L from the lighting device the speckle distribution has a first speckle contrast value C1 selected from the range of 3%<C1<100%, wherein the predetermined distance L is selected from the range of 0.5-50 m.

In yet an aspect, the invention also provides lighting device configured to generate lighting device light, the lighting device comprising (i) a first laser light source configured to generate a beam of first laser light, (b) a rotatable and/or vibrable speckle control element, and (c) a control system configured to control the speckle control element, wherein in an operation mode of the control system the speckle control element is configured in an optical path of the first laser light source light for providing the lighting device light comprising a speckle distribution of the first laser light source light.

In embodiments, the control system configured to dynamically control the speckle control element. Especially, in embodiments the control system is further configured to dynamically control with the speckle control element the first speckle contrast value C1 in one or more of the one or more control modes. Herein the term "dynamically" especially indicates that the speckle contrast value may change with time. Hence, in embodiments the control system may be configured to control the (first) speckle contrast value according to a predefined time scheme. The time scheme may e.g. last for at least 2 minutes, or at least 5 minutes, or at least 10 minutes, or at least 30 minutes, or at least an hour, or at least 4 hours, or at least 8 hours, or essentially permanent. In embodiments, at least once in 10 minutes, such as at least once in 5 minutes, the (first) speckle contrast value may be changed. In other embodiments, the (first) speckle contrast value is not changed more often than once each 1 second, such as not more often than once each 5 seconds, such as not more often than at least once per 10 seconds. The term "a predefined time scheme" may also refer to a plurality of different predefined time schemes.

The time scheme may vary in time with fixed contrast value differences in time and/or with randomly chosen contrast value differences in time and/or with semi-randomly chosen contrast value differences in time. Alternatively or additionally, the time scheme may vary in time with fixed time periods between different contrast values and times a contrast value is maintained fixed and/or with randomly chosen time periods between different contrast values and times a contrast value is maintained fixed and/or with semi-randomly chosen time periods between different contrast values and times a contrast value is maintained fixed. Different (first) contrast values may thus especially be chosen from the range of 3%<C1<100%.

In embodiments, during one or more operation modes, C1 is at least 10% (during at least part of the time). Especially, during one or more operation modes one or more (first) speckle contrast values C1 are selected from the range of 10%≤C1≤90% (during at least part of the time). Contrast values lower than 10%, and especially lower than 3% may be difficult or even essentially impossible to see with the human eye. Speckle contrast values of at least 10%, and certainly at least 20% will be seen be seen by essentially all humans (without impaired vision); hence, (first) speckle contrast values may e.g. be selected from the range of 10%≤C1<100%, such as from the range of 20%≤C1<100%. Speckle contrast values of at least 80%, and especially at least 90%, may be perceived to harsh for many humans; hence, (first) speckle contrast values may e.g. be selected from the range of 3%≤C1≤90%, such as from the range of 3%≤C1≤80%. Hence, in embodiments the (first) speckle contrast values C1 are selected from the range of 10%≤C1≤90%, such as selected from the range of 20%≤C1≤80%. Therefore, in specific embodiments during one or more operation modes one or more (first) speckle contrast values C1 are selected from the range of 20%≤C1≤80% (during at least part of the time).

The change in time between two different speckle contrast values may not be to fast; otherwise a change is not perceived (by the human eye). Also, the time at which a speckle contrast value is pending, may not be too short, otherwise the speckle contrast is not perceived (by the human eye). Further, the differences in speckle contrast value may not be too small, otherwise the difference is not perceived (by the human eye).

In embodiments in a control mode the first speckle contrast value C1 is at a primary value C11 during a first time period t1, changes to a secondary value C12 over a transition time period tt, and is at the secondary value C12 during a second time period t2.

Especially, in embodiments the first time period t1 is at least 0.02 seconds, the second time period is at least 0.02 seconds, and the transition time period is equal to or smaller than 10 minutes, such as equal to or smaller than 5 minutes.

Especially, in embodiments the first time period t1 is at least 0.5 seconds, such as at least 1 second, like at least 2 seconds. Alternatively or additionally, the second time period is at least 0.5 seconds, such as at least 1 second, like at least 2 seconds. Even more especially, t1 and t2 are each individually selected from the range of 2 seconds-10 minutes, such as 5 seconds-2 minutes.

Further, alternatively or additionally the transition time period may be equal to or smaller than 2 minutes. A fast transition time, even smaller than 0.02 seconds may also be possible, as long at the different first speckle contrast values before and after the transition can be visible to a human, i.e. t1 and t2 are at least 0.02 seconds, but especially at least 2 seconds.

Times of t1 and/or t2 larger than 0.02 second may be seen by most people, and when t1 and/or t2 are at least 0.5 second, or even 2 seconds, may be seen by essentially all humans (without impaired vision).

Therefore, in embodiments frequencies of repeating speckle contrast values and/or frequencies of change may be selected from frequencies of about 5 Hz or lower, such as 25 Hz or lower, like 10 Hz or lower, such as 1 Hz or lower, like especially 0.5 Hz or lower. Frequencies of lower than 50 Hz may be visible to the human eye, and frequencies of 25 Hz or lower, or especially 10 Hz or lower may be seen by essentially all humans (without impaired vision).

Further, in specific embodiments one of the primary value C11 and the secondary value C12 is at least 10%, such as at least 20%, like at least 30%, larger than the other of the primary value C11 and the secondary value C12. The larger the difference in contrast value, the stronger the sparkling effect may be perceived.

In embodiments, a change between the at least two different first speckle contrast values C1 may be executed gradually. Alternatively, a change between the at least two different first speckle contrast values C1 may be executed stepwise. Of course, different changes may be executed the same, differently, randomly or semi-randomly. Likewise, the first speckle contrast values may be selected according to a predetermined time scheme, according to fixed rules, randomly, or semi-randomly. Hence, in embodiments the control system is configured vary between at least two different first speckle contrast values C1, wherein one or more of the following applies: (a) executing a change between the at least two different first speckle contrast values C1 gradually, (b) executing a change between the at least two different first speckle contrast values C1 stepwise, and (c) selecting two or more of the at least two different first speckle contrast values C1 randomly.

In specific embodiments, however, especially the control system is configured to vary the first speckle contrast value C1 over time, wherein during the operation mode for a period of each at least 0.02 seconds one or more speckle contrast values C1 are selected from the range of 10%≤C1≤90%. Hence, t1 and t2 may each at least 0.02 seconds one or more speckle contrast values C1 are selected from the range of 10%≤C1≤90%. As indicated above, t1 and t2 may in embodiments each individually be selected from the range of 2 seconds-10 minutes, such as 5 seconds-2 minutes.

Here, the term "semi-random" is applied as times and contrast values may have to be selected from the herein defined respective changes.

As will be further elucidated below in embodiments the control system may also be configured to control the (further) speckle contrast value according to a predefined time scheme. Also, for those further speckle contrast values the above defined embodiments may apply (see also below).

The speckle control element may in embodiments be a diffusor. The diffusor can be transmissive and/or reflective. Hence, diffusor may in embodiments comprises a light transmissive material with elements on a surface and/or in the material that diffuse the light. Such elements may be configured randomly or regularly. For instance, a light transmissive polymeric material with diffusor particles having sizes that are about the wavelength or larger than the wavelength of the laser light source light. Hence, the speckle control element may comprise in embodiments a diffusor plate. In specific embodiments, the speckle control element may have areas with different diffusivity. Such areas may also be indicated as areas with different diffusive patterns. Note that the patterns may be regular, irregular, or a combination thereof. Hence, in embodiments the speckle control element may introduce scattering. Especially, in embodiments the speckle control element may be used to introduce in a controllable way scattering, and thereby in a controllable way speckle contrast.

The speckle control element may in specific embodiments be movable while being in the path of the laser light source light. By moving, the speckle contrast value may be controlled. Hence, in specific embodiments the speckle control element may comprise a movable diffusor element.

Therefore, in yet further specific embodiments the lighting device may also comprising an actuator configured to rotate and/or vibrate the speckle control element. Especially, in such embodiments the control system may be configured to control the actuator (and thereby control the speckle control element).

In specific embodiments, the speckle control element is rotatable, wherein the actuator is configured to rotate the speckle control element (during the operation mode), wherein one or more of the following applies: (i) an angular frequency of the speckle control element is controlled by the actuator, and (ii) the speckle control element comprises two or more areas with different diffusing patterns which during rotation of the speckle control element are alternatingly configured in the optical path (during an operation mode).

Alternatively or additionally, the speckle control element is vibrable, wherein the actuator is configured to vibrate the speckle control element, wherein one or more of the following applies: (i) a vibration frequency of the speckle control element is controlled by the actuator; and (ii) the speckle control element comprises two or more areas with different diffusing patterns which during vibration of the speckle control element are alternatingly configured in the optical path (during an operation mode).

Especially in the latter embodiments (vibrating speckle control element), but also in the former embodiments (rotating speckle control element), the beam of first laser light may have an angle (α) with the speckle control element unequal to 90°.

A rotatable speckle control element may be easily balanced. A vibrable speckle control element may be easily controlled. A vibrable speckle control element may e.g. comprise a piezo element for controlling vibration.

The phrase "during the operation mode" may also refer to "during one or more of the one or more control modes".

As can be derived from the above, the control system may especially be configured to control the speckle distribution in dependence of one or more of an input signal of a user interface, a sensor signal (of a sensor), and a timer. Via the user interface, the user may e.g. indicate the predetermined distance, and/or the desired time scheme, etc. etc. A sensor may be used to determine the roughness of a surface in line of sight of the lighting device and/or determine the distance to a surface (to be illuminated), and/or determine background lighting, etc. etc. The term "timer" may refer to a time scheme, but may also refer to e.g. the time the lighting device is operational, like during day time, during working hours, etc. etc. . . . . . Hence, in embodiments the control system may be configured to control one or more of the angular frequency and the vibration frequency in dependence of one or more of an input signal of a user interface, a sensor signal (of a sensor), and a timer.

As indicated above, in specific embodiments the sensor may also be used to determine the roughness of a surface to be illuminated or under illumination (at the predetermined distance). For instance, a surface with high roughness and/or a plurality of facets may provide speckles even with an essentially coherent beam. Hence, in such applications the (first) speckle contrast values may be chosen relatively low. However, when the surface has a low roughness and/or a low number of facets may be available, like often in show room of cars, the (first) speckle contrast values may be relatively higher.

Hence, the lighting device is further comprise an optical sensor configured to sense an area at the predetermined distance (L) from the lighting device illuminated by the lighting device light and to generate a corresponding sensor signal, wherein the control system is configured to control the speckle distribution as function of the sensor signal. The term "optical sensor" may also refer to a camera. The optical sensor may use the (reflected) light of the lighting device and/or may use an alternative source of light. Hence, the control system is configured to estimate a roughness-related parameter of the area on the basis of the sensor signal, and wherein the control system is configured to control the first speckle contrast value C1 as function of the roughness-related parameter.

The lighting device may be based on a single laser light source. The lighting device may also be based on a plurality of essentially identical laser light sources (such as semiconductor laser light sources of the same bin). In such embodiments, the lighting device may generate laser light source light that may have a specific color. However, the lighting device may also comprise one or more further light sources, e.g. to provide white light and/or to provide light having a controllable color rendering index and/or color point. Such one or more further light sources may comprise non-laser light sources of laser light sources.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

Hence, in specific embodiments the lighting device may further comprise one or more second light sources configured to generate second light source light, wherein the second light source light and the first laser light source light have different color points, wherein the lighting device is configured to generate in the operation mode the lighting device light comprising the first laser light source light and the second light source light of one or more of the one or more second light sources.

The term "second light source" may thus refer to one or more identical second light sources, such as semiconductor light sources from the same bin, but may also refer to two or more different light sources. For instance, one or more second light sources may be configured to generate green light and one or more second light sources may be configured to generate red light. When the laser light source is configured to generate blue laser light source light, white light may be generated in one or more of the one or more controlling modes.

One or more of the one or more second light sources may be laser light sources. For those laser light sources, it may possible to (also) introduce speckle. This may be done with the same speckle control element when the speckle control element is also in the path of the light of such one or more second light sources. However, in yet other embodiments other speckle control elements may be applied. In such embodiments, speckle of different colors may be controlled individually.

Hence, in yet further embodiments at least one of the one or more second light sources comprises a second laser light source configured to generate a second beam of second laser light source light, wherein in the operation mode of the control system one or more of the speckle control element and a second speckle control element is configured in an optical path of the second laser light source light for providing the lighting device light comprising a second speckle distribution of the second laser light source light, wherein at the predetermined distance L from the lighting device the second speckle distribution has a second speckle contrast value C2 selected from the range of 3%<C2≤100%, such as 3%<C2<100%, like 10%<C2≤90%, like especially 20%<C2≤80%. See further about the second speckle contrast above in relation to the first speckle contrast.

Note that in specific embodiments for each laser light source light for which the speckle contrast may be controlled, the same conditions and/or parameters as indicated above in relation to the first speckle contrast value and first speckle contrast value differences may apply, such as also in relation to the first time period, the second time period, the transition time period, etc. etc.

Combinations of lasers may be used wherein one or more lasers are configured to generate red light, one or more lasers may be configured to generated green light, and one or more lasers may be configured to generate blue light. Of one or more of the one or more lasers, in specific embodiments of all lasers the speckle contrast value of the laser light source light may be controlled.

Alternatively or additionally, combinations of lasers may be used wherein one or more lasers are configured to generate red light, one or more lasers may be configured to generated green light, and one or more lasers may be configured to generate blue light, and one or more lasers are generated to generate light of yet another color. Of one or more of the one or more lasers, in specific embodiments of all lasers the speckle contrast value of the laser light source light may be controlled. The yet another color may be selected from cyan and/or amber. Of course, when different lasers are configured to generate different colors the laser light source light of such lasers have different spectral distributions. Hence, a blue laser has spectral distribution of the laser light that is different from a cyan laser, etc.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component.

The term "cyan" may refer to one or more wavelengths selected from the range of 490-520 nm. The term "amber" may refer to one or more wavelengths selected from the range of 590-600 nm.

The terms "visible", "visible light" or "visible emission" and similar terms refer to light having one or more wavelengths in the range of about 380-780 nm.

As can be derived from the above, in specific embodiments the lighting device configured to generate white lighting device light during the operation mode.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, etc. The lighting device may also be applied in e.g. showroom lighting or showcase lighting. The device may (thus) also be applied in spot lighting or decorative lighting. The lighting device may also be applied in stage lighting, etc.

Hence, the invention provides in embodiments a laser based white light sources with adjustable (colored) sparkling. In embodiments, the lighting device light (in one or more control modes (during at least part of the time)) may have a CRI of at least 80 and/or a correlated color temperature selected from the range of 1800-6500 K, such as selected from the range of 2000-6000 K. In embodiments, the CRI of the lighting device light may be at least 85, such as at least 88, like even more especially at least 90 (during at least part of the time of one or more control modes).

In yet a further aspect, the invention also provides a lighting system comprising one or more, especially two or more lighting devices, as defined herein, wherein the lighting system is configured to generate lighting system light comprising the lighting device light of one or more of the one or more, especially two or more, lighting devices.

The invention also provides a luminaire or lamp comprising the lighting device.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
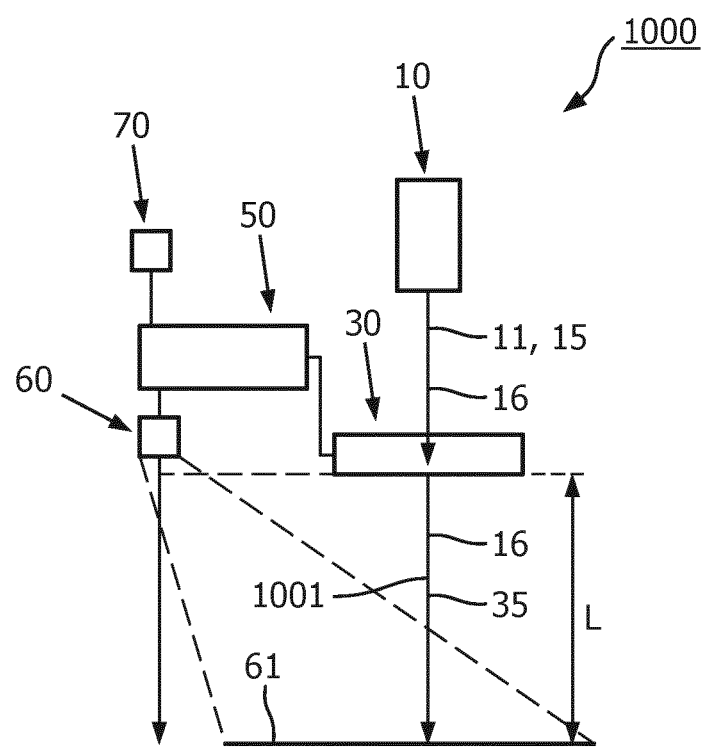
FIGS. 1a-1c schematically depict some embodiments of a lighting device.
Figure 1B:
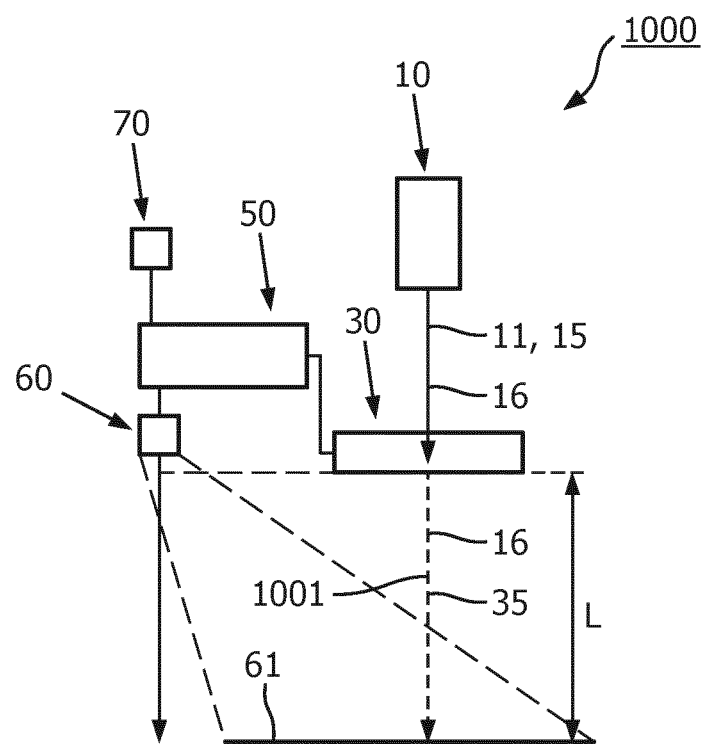
Figure 1C:
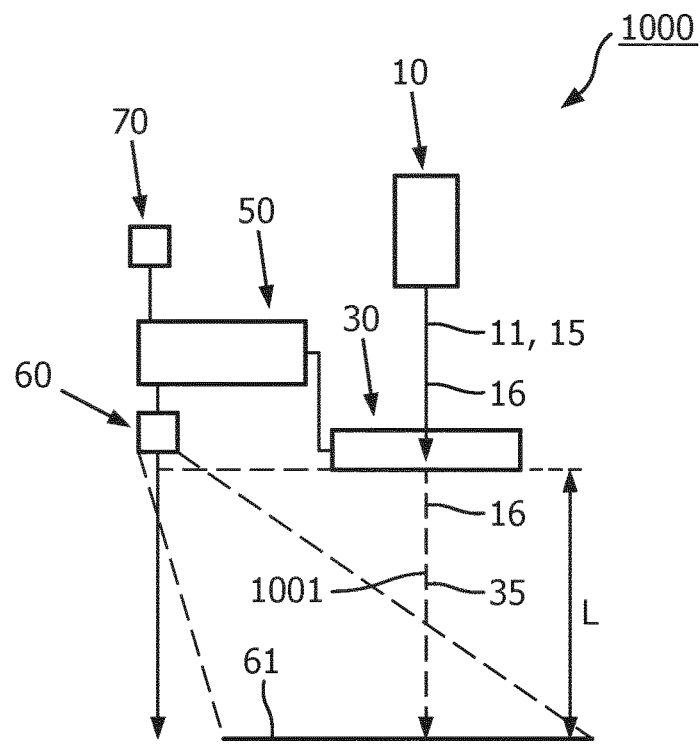

Amongst others, herein a lighting device comprising at least one source giving stimulated emission where the coherence length of the light may be gradually adjusted and/or wherein speckle contrast may be controlled, see FIGS. 1a-1c.

FIGS. 1a-1c schematically depict embodiments of a lighting device 1000 configured to generate lighting device light 1001. The lighting device 1000 comprises a first laser light source 10 configured to generate a beam 15 of first laser light source light 11. The lighting device 1000 also comprises a speckle control element 30.

In one or more control modes (of the control system 50, see also below) the speckle control element 30 may be configured in an optical path 16 of the first laser light source light 11 for providing the lighting device light 1001 comprising a speckle distribution 35 of the first laser light source light 11

At a predetermined distance L from the lighting device 1000 the speckle distribution 35 has a first speckle contrast value C1 selected from the range of 3%<C1<100% (see further also below).

The predetermined distance L may be selected from the range of 0.5-50 m

The lighting device 1000 may further comprise a control system 50. Reference 70 indicates a user interface. Via the user interface 70, such as a graphical user interface, the user may e.g. indicate the predetermined distance, and/or the desired time scheme, etc. etc. Especially, in embodiments the control system 50 may be further configured to dynamically control with the speckle control element 30 the first speckle contrast value C1 in one or more of the one or more control modes.

Reference 16 indicates the optical path of the laser light source light. It may coincide with an optical axis.

A sensor may be used to sense the surface roughness and adapt the speckle accordingly, see FIGS. 1a-1c. Hence, in embodiments the lighting device 1000 may further comprise an optical sensor 60 configured to sense an area 61 at the predetermined distance L from the lighting device 1000 illuminated by the lighting device light 1001 and to generate a corresponding sensor signal, wherein the control system 50 is configured to control the speckle distribution 35 as function of the sensor signal. The optical sensor may sense in the line of sight of the lighting device, i.e. it may sense (also) at the predetermined distance L1. At a distance, it may sense an area 61 which may be illuminated with the lighting device light 1001. The sensor may in specific embodiments use reflected lighting device light 1001 to estimate a surface roughness.

In specific embodiments, the control system 50 is configured to estimate a roughness-related parameter of the area 61 on the basis of the sensor signal, and wherein the control system 50 is configured to control the first speckle contrast value C1 as function of the roughness-related parameter.

In embodiments, the control system 50 may be configured to control the speckle distribution 35 in dependence of one or more of an input signal of a user interface, a sensor signal of a sensor, and a timer.

Schematically, speckle contrast may increase from FIG. 1a to FIG. 1c.

The laser light source 10 may be combined with other light sources. For example, a blue laser diode may be combined with a green and red solid-state light source such as a LED, see also FIG. 2.

Hence, in embodiments the lighting device 1000 may further comprise one or more second light sources 120 configured to generate second light source light 121. The second light source light 121 and the first laser light source light 11 especially have different color points. The lighting device 1000 is especially configured to generate in the operation mode the lighting device light 1001 comprising the first laser light source light 11 and/or the second light source light 121 of one or more of the one or more second light sources 120. One or more of the one or more second light sources 120 may also be laser light sources 1200. Each of the light source has its own optical path, which are essentially combined, in this schematically depicted embodiment, with a light mixing element, such as one or more dichroic mirrors, which may be configured to combine the optical paths of the different lights of the light sources 10, 120. The light mixing element, such as the dichroic mirror(s), is (are) indicated with reference 40. Other light mixing elements may also be used.

Note that even though two second light sources 120 are schematically depicted, only one, or more than two second light sources may be comprised by the lighting device 1000.

Figure 3:
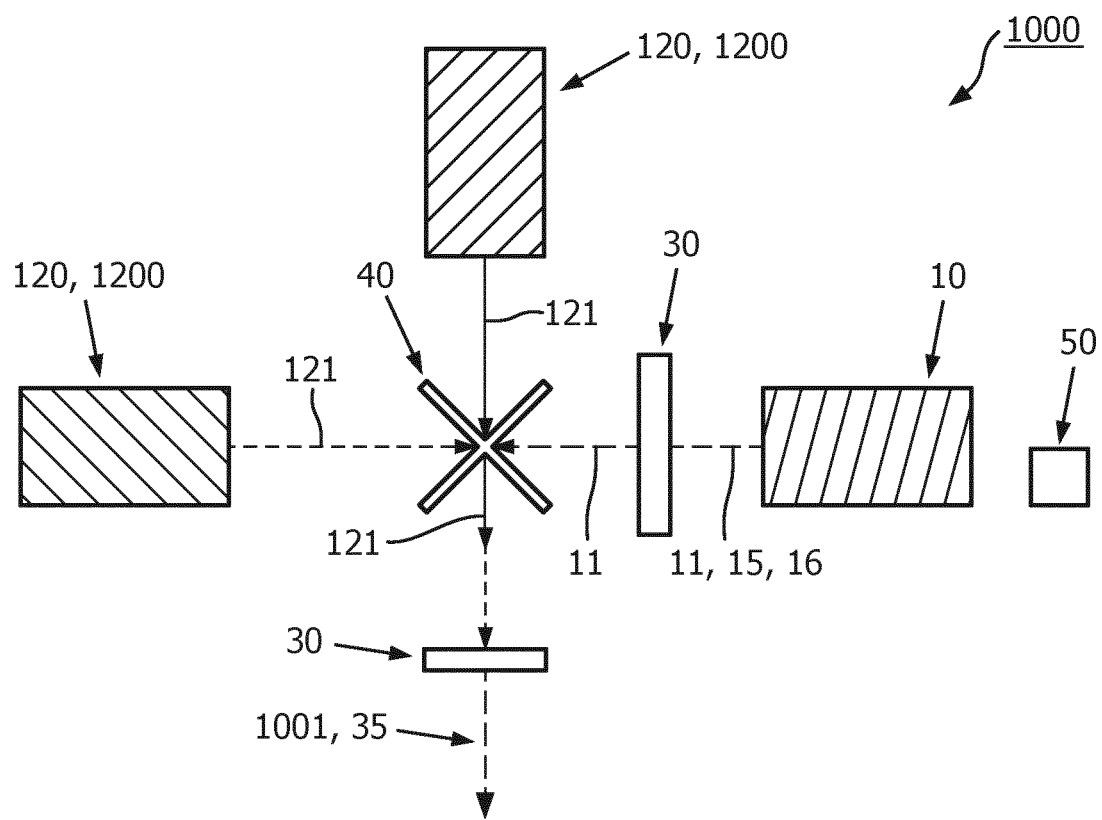

FIG. 3 schematically depicts an embodiment wherein the speckle may only be controlled for the first laser light source 10, and not for the other (laser) light source(s) 120.

Figure 4:
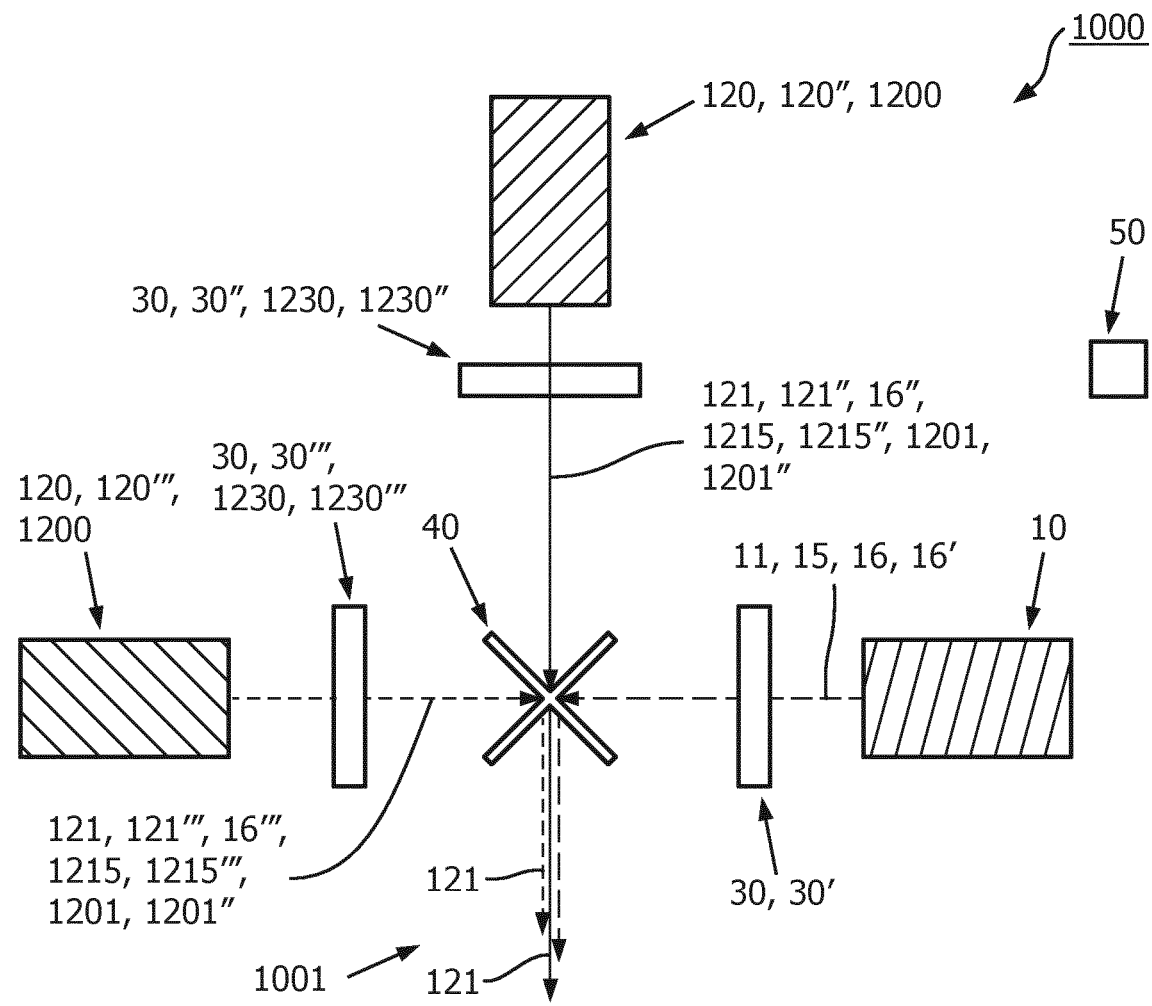

FIG. 4 schematically depicts an embodiment wherein the speckle control element 130 is configured downstream of all the laser light sources 10 and second light source(s) 120. This may especially be of relevance when the one or more second light sources 120 are also laser light sources 1200.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

When there are more than two (different) laser light sources, it may be of interest to control speckle contrast for the more than two (different) laser light sources individually. Hence, in embodiments at least one of the one or more second light sources 120 comprises a second laser light source 1200 configured to generate a second beam 1215 of second laser light source light 1201, wherein in the operation mode of the control system 50 one or more of the speckle control element 30 and a second speckle control element 1230 is configured in an optical path 1216 of the second laser light source light 1201 for providing the lighting device light 1001 comprising a second speckle distribution 1235 of the second laser light source light 1201. Especially, also at the predetermined distance from the lighting device 1000 the second speckle distribution 1235 may have a second speckle contrast value C2 e.g. selected from the range of 3%<C2<100%. The indications with ' and " and ''' are used to distinguish between elements related to the first laser light source 10, a primary second light source 120 (i.e. 120"), and an optional secondary second light source (i.e. 120'''). Hence, as schematically depicted in FIG. 4, the lighting device 1000 may comprise more than one speckle control element, as indicated with the first speckle control element 30 and one or more second speckle control elements 1230.

With more than one (laser) light sources 10, 120, it may be possible to generate white light. Hence, in embodiments the lighting device 1000 may be configured to generate white lighting device light 1001 during the operation mode.

Figure 2:
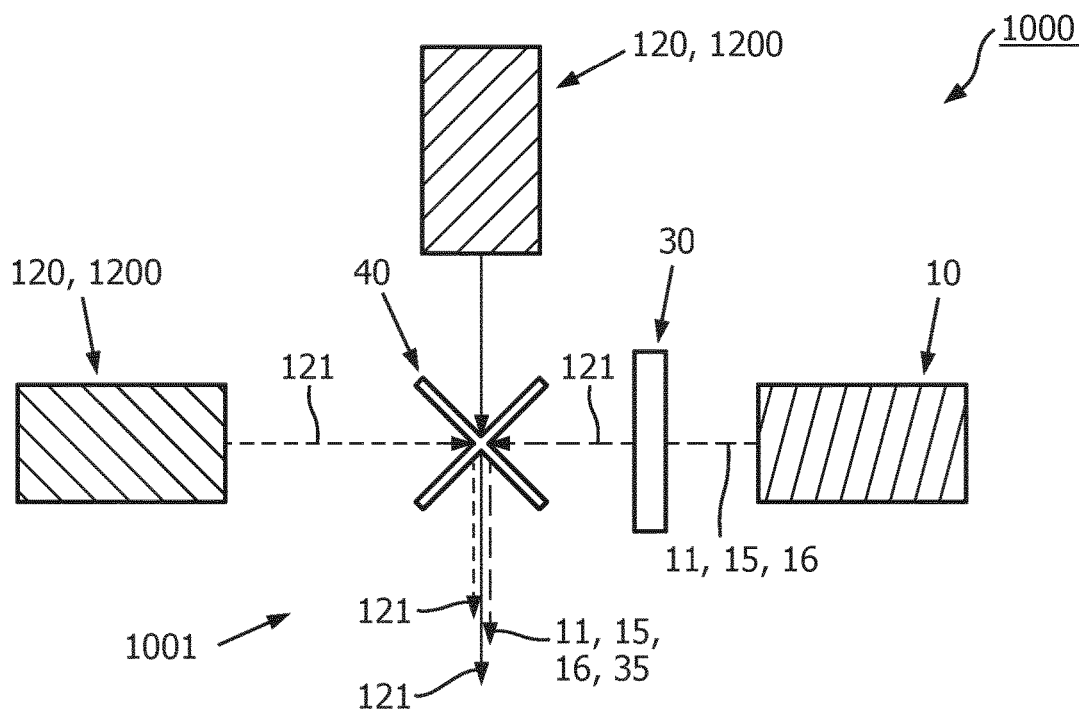
FIGS. 2-4 schematically depict some further embodiments of a lighting device.

Referring to FIGS. 2-4, when more light sources with stimulated emission such as RGB lasers are used then the speckle per color can also be controlled. This may be done time sequential (see e.g. FIG. 4); this may also be done at the same time (FIG. 3). In embodiments, pulse width modulation may be used. Hence, speckle contrast of one or more components of RGB, or of one or more components of RYB, or of one or more components of RGBX, where X may be cyan and/or amber, may be controlled. Hence, speckle per color may be controlled in embodiments.

Figure 5A:
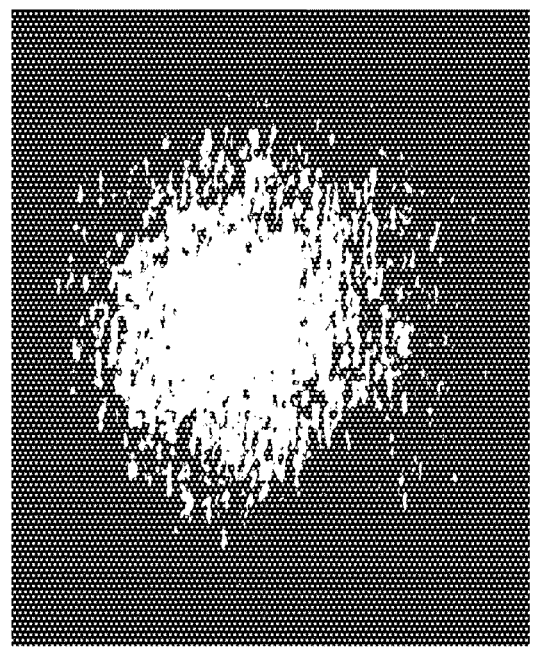
FIGS. 5a-5c schematically depict some aspects.

FIG. 5a schematically depicts an area 61 with a speckle distribution 35. From such graph, the speckle contrast value may be determined. The speckle contrast value (C) may be defined as the ratio of the standard deviation ($\sigma$) of the intensity of the captured image to the mean ($<I>$) of the intensity of the pattern. The captured image may thus be a cross-sectional image of the (beam of) lighting device light at the predetermined distance.

Figure 5B:
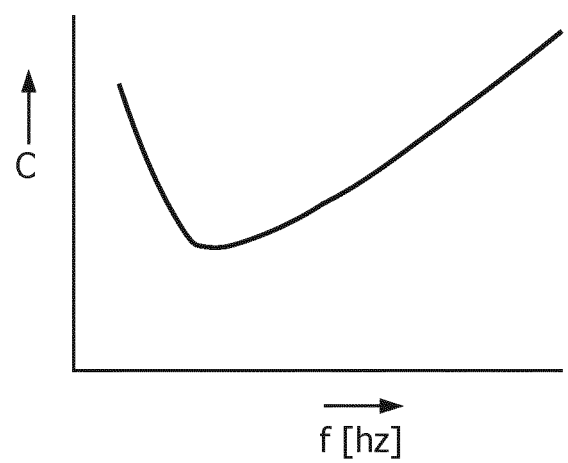

FIG. 5b schematically shows that the speckle contrast value may depend upon the (rotational or vibrational) frequency of a speckle contrast element (see further below).

Figure 5C:
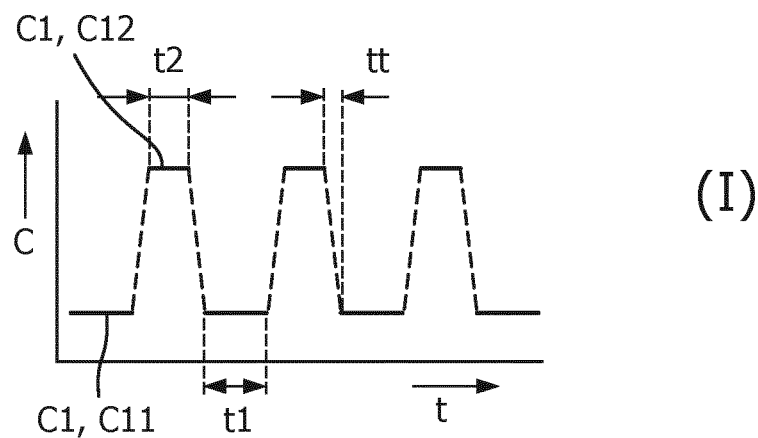
Figure 5C:
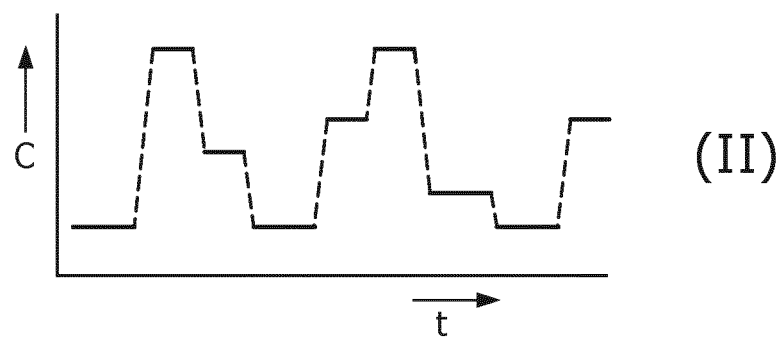
Figure 5C:
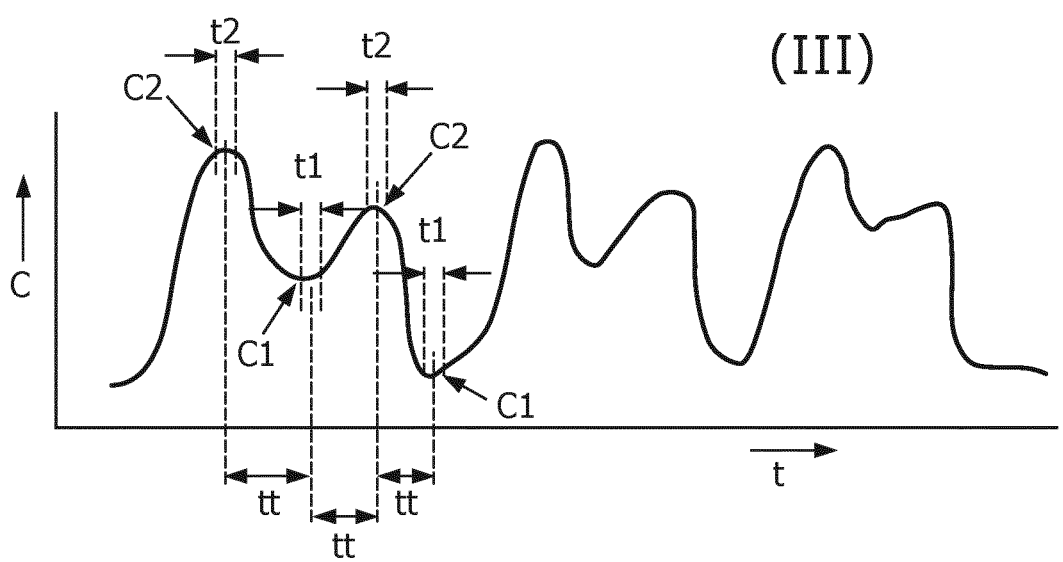

FIG. 5c schematically depict some possible schemes, indicated with references I, II, and III. Referring to these non-limiting number of options in FIG. 5c, in a control mode the first speckle contrast value C1 is at a primary value C11 during a first time period t1, changes to a secondary value C12 over a transition time period tt, and is at the secondary value C12 during a second time period t2. In specific embodiments, one of the primary value C11 and the secondary value C12 is at least 20% larger than the other of the primary value C11 and the secondary value C12, more preferably at least 40% larger, even more preferably at least 60% larger and most preferably at least 80% larger. Further, in specific embodiments the first time period t1 is at least 0.02 seconds, the second time period is at least 0.02 seconds, and the transition time period is equal to or smaller than 5 minutes.

In embodiments, between at least two different first speckle contrast values C1 may be varied, wherein one or more of the following applies: (a) executing a change between the at least two different first speckle contrast values C1 gradually (e.g. III), (b) executing a change between the at least two different first speckle contrast values C1 stepwise (e.g. variants I and II), and (c) selecting two or more of the at least two different first speckle contrast values C1 randomly (e.g. variant II).

In embodiments, the control system 50 may be configured to vary the first speckle contrast value C1 over time, wherein during the operation mode for a period of each at least 0.02 seconds one or more speckle contrast values C1 are selected from the range of 10%≤C1≤90%.

Figure 6A:
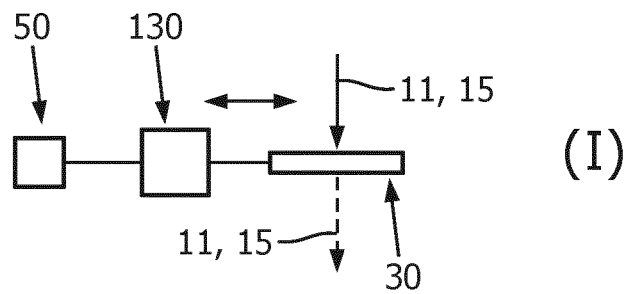
FIGS. 6a-6b schematically depict some further aspects.
Figure 6A:
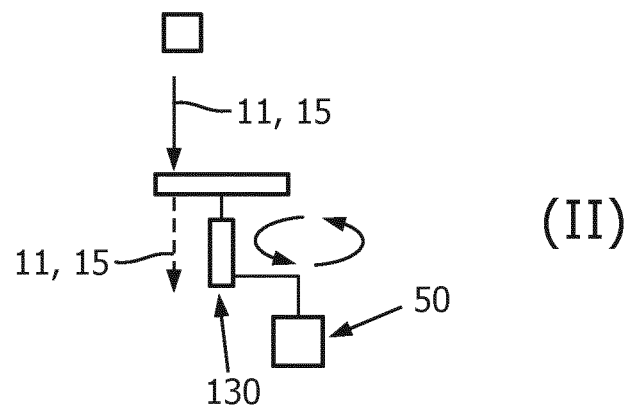
Figure 6A:
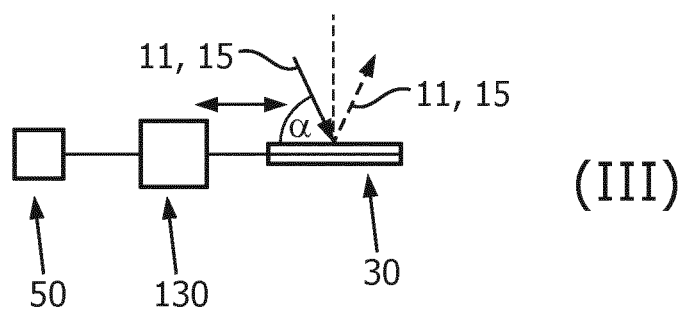
Figure 6A:
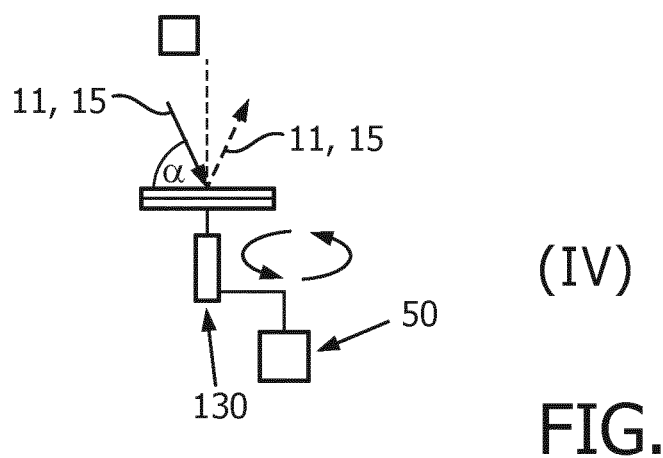

For controlling the coherence length, a vibrating or rotating diffusor can be used either in the transparent mode or reflective mode (see FIG. 6a). In embodiments, the lighting device 1000 may further comprise an actuator 130 configured to rotate and/or vibrate the speckle control element 30.

The control system 50 may especially be configured to control the actuator 130 (and thereby control the speckle control element 30).

In embodiments, the speckle control element 30 may be rotatable (see variants I and IV). Especially, in such embodiments the actuator 130 may be configured to rotate the speckle control element 30 (during the operation mode). In embodiments, one or more of the following applies: (i) an angular frequency of the speckle control element 30 is controlled by the actuator 130, and (ii) the speckle control element 30 comprises two or more areas 31 with different diffusing patterns which during rotation of the speckle control element 30 are alternatingly configured in the optical path 16 (during an operation mode) (see further also FIG. 6b, especially variant I).

Alternatively (or additionally), the speckle control element 30 may be vibrable (able to vibrate). Especially, in such embodiments the actuator 130 may be configured to vibrate the speckle control element 30. In embodiments, one or more of the following applies: (i) a vibration frequency of the speckle control element 30 is controlled by the actuator 130; and (ii) the speckle control element 30 comprises two or more areas 31 with different diffusing patterns which during vibration of the speckle control element 30 are alternatingly configured in the optical path 16 (during an operation mode) (see further also FIG. 6b, especially variant II). As shown in variants III and IV, the beam 15 of first laser light 11 may have an angle $\alpha$ with the speckle control element 30 unequal to 90°, such as selected from the range of at least 30°, but smaller than 90°. However, 90° is thus also possible (see variants I and II).

Hence, in embodiments the control system 50 may be configured to control one or more of the angular frequency and the vibration frequency in dependence of one or more of an input signal of a user interface 70, a sensor signal of a sensor, and a timer.

Figure 6B:
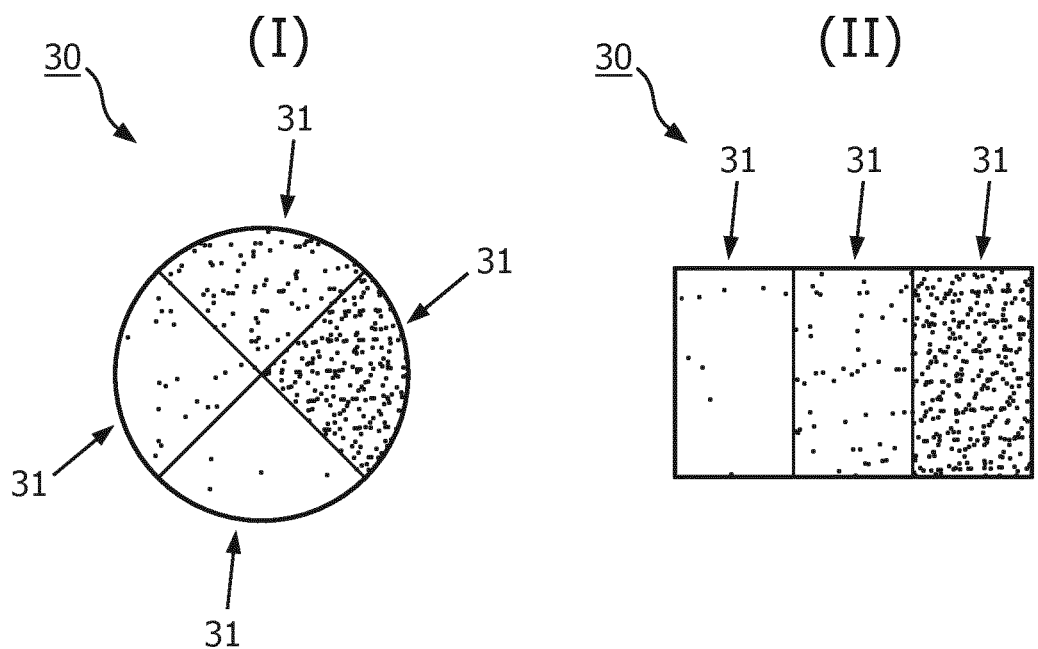
Figure 7:
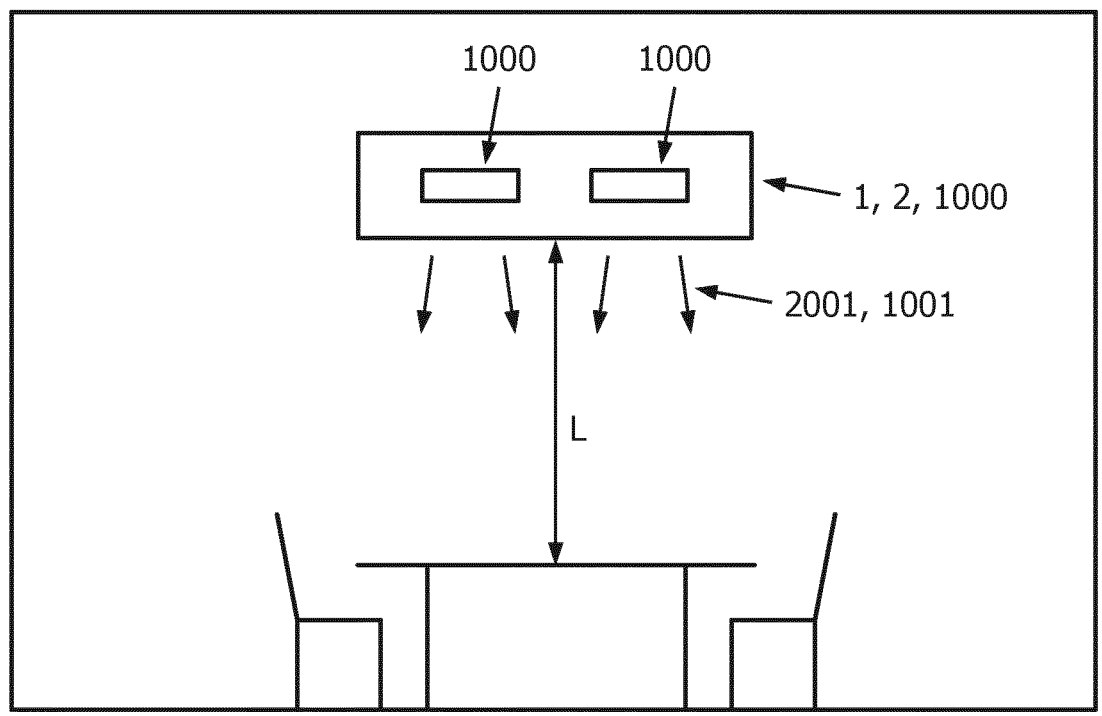
FIG. 7 schematically depict an embodiment of a lighting system comprising a lighting device.

FIG. 6b schematically depict two embodiments of speckle control elements 30, which may have different areas 31 with different diffusing patterns. By way of example, in variant I four different areas 31 are depicted, with different diffusivities. In variant II, three different areas 31 are depicted, with different diffusivities.

Hence, for controlling the coherence length of the sources giving stimulated emission a vibrating or rotating diffusor may be used. By adjusting the frequency of rotation and/or vibration the coherence length may be altered for adjusting speckle and/or the color of the sparkling effect.

Examples

In the table below examples of values for parameters C11, C12, t1, t2 and tt (see FIG. 5C) are shown.

| Example | C11 (%) | C12 (%) | t1 (s) | t2 (s) | tt (s) |
|---|---|---|---|---|---|
| 1 | 95 | 9 | 1 | 1 | 3 |
| 2 | 81 | 19 | 2 | 2 | 0.05 |
| 3 | 75 | 35 | 1 | 4 | 0.1 |
| 4 | 71 | 23 | 4 | 1 | 1 |
| 5 | 69 | 37 | 10 | 10 | 10 |

In a first example, C11 is 95%, C12 is 9%, t1 is 1 s, t2 is 1 s and tt is 3 s. The difference between C11 and C12 may be very large e.g. >80% (in this example 86%) which results a very noticeable effect. The difference between parameters C11 and C12 may be in the range of 80-90%, more preferable in the range of 80-85%. Parameter t1 may be equal to t2 (in this example 1s) which results in a gentle balanced effect. The value of the parameter tt may be rather large e.g. >2 s (in this example 3s) which results in a gradual effect.

In a second example, C11 is 81%, C12 is 19%, t1 is 2 s, t2 is 2 s, tt is 0.05 s. The difference between C11 and C12 may be large e.g. >60% (in this example 62%) which results a very noticeable effect. The difference between parameters C11 and C12 may be in the range of 60-90%, more preferable in the range of 70-80%. Parameter t1 may be equal to t2 (in this example 2s) which results in a gentle balanced effect. The value of tt may be rather small e.g. <0.5 s (in this example 0.05 s) which results in an abrupt noticeable effect.

In a third example, C11 is 75%, C12 is 35%, t1 is 1 s, t2 is 4 s and tt is 0.1 s. The difference between C11 and C12 may be moderate e.g. in the range from 35% to 60% (in this example 40%) which results a moderate noticeable effect. Parameter t1 may be shorter than t2 (in this example 1 s vs 4 s) which results in a noticeable imbalanced effect. Parameter tt may be rather short e.g. <0.5 s (in this example 0.1 s) which results in an abrupt noticeable effect.

In a fourth example, C11 is 71%, C12 is 23%, t1 is 4 s, t2 is 1 s and tt is 1 s. The difference between C11 and C12 may be moderate e.g. in the range from 35% to 60% (in this example 48%) which results a moderate noticeable effect. The value of parameter t1 may be larger than the value of the parameter t2 (in this example 4 s vs. 1 s) which results in a noticeable imbalanced effect. The value of the parameter tt may be not too large and not to small e.g. in the range from 0.5 s 2 s (in this example 1s) which results in a gentle effect.

In a fifth example, C11 is 69%, C12 is 37%, t1 is 10 s, t2 is 10 s, tt is 10 s. The difference between C11 and C12 may be relatively small e.g. in the range from 20% to 35% (in this example 32%) which results a gentle noticeable effect. Parameter t1 may be equal to t2 (in this example 10s) which results in a balanced effect. Parameter tt may be rather large e.g. >2 s (in this example 10s) which results in a gradual effect.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device configured to generate lighting device light, wherein the lighting device comprises (i) a first laser light source configured to generate a beam of first laser light source light, (ii) a speckle control element, and (iii) a control system, wherein in one or more control modes of the control system the speckle control element is configured in an optical path of the first laser light source light for providing the lighting device light comprising a speckle distribution of the first laser light source light, wherein at a predetermined distance L from the lighting device the speckle distribution has a first speckle contrast value C1 selected from the range of 3%<C1<100%, wherein the predetermined distance L is selected from the range of 0.5-50 m, and wherein the control system is further configured to dynamically control with the speckle control element the first speckle contrast value C1 in one or more of the one or more control modes, wherein the lighting device further comprises an optical sensor configured to sense an area at the predetermined distance from the lighting device illuminated by the lighting device light and to generate a corresponding sensor signal, wherein the control system is configured to control the speckle distribution as function of the sensor signal, and wherein the control system is configured to estimate a roughness-related parameter of the area on the basis of the sensor signal, and wherein the control system is configured to control the first speckle contrast value C1 as function of the roughness-related parameter.

2. The lighting device according to claim 1, wherein in a control mode the first speckle contrast value C1 is at a primary value C11 during a first time period t1, changes to a secondary value C12 over a transition time period tt, and is at the secondary value C12 during a second time period t2, wherein one of the primary value C11 and the secondary value C12 is at least 20% larger than the other of the primary value C11 and the secondary value C12, wherein the first time period t1 is at least 0.02 seconds, wherein the second time period is at least 0.02 seconds, and wherein the transition time period is equal to or smaller than 5 minutes.

3. The lighting device according to claim 1, wherein the control system is configured vary between at least two different first speckle contrast values C1, wherein one or more of the following applies: (a) executing a change between the at least two different first speckle contrast values C1 gradually, (b) executing a change between the at least two different first speckle contrast values C1 stepwise, and (c) selecting two or more of the at least two different first speckle contrast values C1 randomly.

4. The lighting device according to claim 1, comprising an actuator configured to rotate and/or vibrate the speckle control element, wherein the control system is configured to control the actuator.

5. The lighting device according to claim 4, wherein the speckle control element is rotatable, wherein the actuator is configured to rotate the speckle control element, wherein one or more of the following applies: (i) an angular frequency of the speckle control element is controlled by the actuator, and (ii) the speckle control element comprises two or more areas with different diffusing patterns which during rotation of the speckle control element are alternatingly configured in the optical path.

6. The lighting device according to claim 4, wherein the speckle control element is vibrable, wherein the actuator is configured to vibrate the speckle control element, wherein one or more of the following applies: (i) a vibration frequency of the speckle control element is controlled by the actuator; and (ii) the speckle control element comprises two or more areas with different diffusing patterns which during vibration of the speckle control element are alternatingly configured in the optical path.

7. The lighting device according to claim 6, wherein the beam of first laser light has an angle ($\alpha$) with the speckle control element unequal to 90°.

8. The lighting device according to claim 2, wherein the control system is configured to control the speckle distribution in dependence of one or more of an input signal of a user interface and a timer.

9. The lighting device according to claim 1, wherein the control system is configured to vary the first speckle contrast value C1 over time, wherein during the operation mode for a period of each at least 0.02 seconds one or more speckle contrast values C1 are selected from the range of $10\% \leq C1 \leq 90\%$.

10. The lighting device according to claim 1, wherein the optical sensor is a camera.

11. The lighting device according to claim 1, wherein the first speckle contrast value C1 is selected from the range of $20\% \leq C1 \leq 80\%$.

12. The lighting device according to claim 1, further comprising one or more second light sources configured to generate second light source light, wherein the second light source light and the first laser light source light have different color points, wherein the lighting device is configured to generate in the operation mode the lighting device light comprising the first laser light source light and the second light source light of one or more of the one or more second light sources.

13. The lighting device according to claim 12, wherein at least one of the one or more second light sources comprises a second laser light source configured to generate a second beam of second laser light source light, wherein in the operation mode of the control system one or more of the speckle control element and a second speckle control element is configured in an optical path of the second laser light source light for providing the lighting device light comprising a second speckle distribution of the second laser light source light, wherein at the predetermined distance L from the lighting device the second speckle distribution has a second speckle contrast value C2 selected from the range of 3%<C2<100%.

14. The lighting device according to claim 12, configured to generate white lighting device light during the operation mode.

15. A lighting system comprising two or more lighting devices according to claim 1, wherein the lighting system is configured to generate lighting system light comprising the lighting device light of one or more of the two or more lighting devices.

* * * * *